(12) United States Patent
Schillinger et al.

(10) Patent No.: US 10,690,516 B2
(45) Date of Patent: Jun. 23, 2020

(54) PROTECTIVE COMPOUND-ENVELOPED SENSOR FOR DETECTING THE POSITION OF AN ENCODER ELEMENT

(71) Applicant: Continental Teves AG & Co. oHG, Frankfurt (DE)

(72) Inventors: Jakob Schillinger, Gaimersheim (DE); Dietmar Huber, Rödermark (DE); Frank Grunwald, Oberursel (DE); Hilmar Müller, Heuchelheim (DE); Manfred Goll, Glauburg (DE)

(73) Assignee: Continental Teves AG & Co. oHG (DE)

( * ) Notice: Subject to any disclaimer, the term of this patent is extended or adjusted under 35 U.S.C. 154(b) by 175 days.

(21) Appl. No.: 14/653,957

(22) PCT Filed: Dec. 17, 2013

(86) PCT No.: PCT/EP2013/076927
§ 371 (c)(1),
(2) Date: Jun. 19, 2015

(87) PCT Pub. No.: WO2014/095881
PCT Pub. Date: Jun. 26, 2014

(65) Prior Publication Data
US 2015/0316395 A1   Nov. 5, 2015

(30) Foreign Application Priority Data

Dec. 20, 2012   (DE) .................. 10 2012 224 075

(51) Int. Cl.
*G01D 5/20* (2006.01)
*G01D 11/24* (2006.01)
*G01B 7/14* (2006.01)

(52) U.S. Cl.
CPC ............ *G01D 5/20* (2013.01); *G01B 7/14* (2013.01); *G01D 5/2013* (2013.01); *G01D 11/245* (2013.01); *Y10T 29/4913* (2015.01)

(58) Field of Classification Search
CPC .... G01D 5/2006; G01D 5/202; G01D 5/2026; G01D 5/2033; G01D 5/204;
(Continued)

(56) References Cited

U.S. PATENT DOCUMENTS 3,371,272 A * 2/1968 Stanton ................. G01V 3/107
                                            324/207.18
4,596,973 A    6/1986 Form
(Continued)

FOREIGN PATENT DOCUMENTS

CN   102171536   8/2011
DE   3400870     7/1985
(Continued)

OTHER PUBLICATIONS

Chinese Office Action dated May 25, 2016 for Chinese Application No. 201380073352.3, including translation, 17 pages.
(Continued)

*Primary Examiner* — David M Schindler
(74) *Attorney, Agent, or Firm* — RatnerPrestia

(57) ABSTRACT

The sensor for detecting the position of a generator element which outputs a position-dependent physical variable, the sensor includes a transducer for converting the physical variable into an electric generator signal, a circuit on a wiring support for receiving the generator signal from the transducer and outputting a measurement signal that corresponds to the generator signal and a protective compound which at least partially surrounds the transducer and the wiring support, thus retaining the transducer on the wiring support.

5 Claims, 4 Drawing Sheets

(58) Field of Classification Search
CPC .... G01D 5/2046; G01D 5/2053; G01D 5/206; G01D 5/2066; G01D 5/2073; G01D 5/208; G01D 5/2086; G01D 5/2093; G01D 5/22; G01D 5/2208; G01D 5/2216; G01D 5/2225; G01D 5/2233; G01D 5/2241; G01D 5/225; G01D 5/2258; G01D 5/2266; G01D 5/2291; G01D 5/2013; G01D 5/20; G01D 11/245; G01B 7/14; G01B 7/30
See application file for complete search history.

(56) References Cited

U.S. PATENT DOCUMENTS

| | | | |
|---|---|---|---|
| 4,847,557 A * | 7/1989 | Saito | G01P 1/026 174/522 |
| 5,010,263 A | 4/1991 | Murata | |
| 5,254,807 A | 10/1993 | Pfander | |
| 5,479,697 A | 1/1996 | Togo | |
| 5,659,246 A | 8/1997 | Togo | |
| 5,789,920 A * | 8/1998 | Gass | B29C 70/84 324/207.15 |
| 5,998,988 A * | 12/1999 | Dickmeyer | G01P 3/488 324/174 |
| 6,037,766 A | 3/2000 | Goossens | |
| 6,334,361 B1 | 1/2002 | DeVolder | |
| 6,636,034 B2 | 10/2003 | Skarpil | |
| 6,904,695 B2 | 6/2005 | Freitag | |
| 7,275,517 B2 | 10/2007 | Kurita | |
| 7,372,253 B2 | 5/2008 | Biber | |
| 7,535,135 B2 | 5/2009 | Kardeis | |
| 7,608,346 B2 | 10/2009 | Braun | |
| 7,610,684 B2 | 11/2009 | Steinich | |
| 7,896,626 B2 | 3/2011 | Shibuya | |
| 8,047,095 B2 | 11/2011 | Aso | |
| 8,098,061 B2 | 1/2012 | Elliott et al. | |
| 8,274,275 B2 | 9/2012 | Steinich et al. | |
| 8,339,124 B2 | 12/2012 | Schneider | |
| 8,502,656 B2 | 8/2013 | Lee | |
| 8,623,254 B2 | 1/2014 | Goetz | |
| 8,635,986 B2 | 1/2014 | Ikeda | |
| 8,710,832 B2 | 4/2014 | Hiramoto | |
| 8,779,759 B2 | 7/2014 | Hirning | |
| 8,820,160 B2 | 9/2014 | Doering | |
| 8,823,366 B2 | 9/2014 | Babin | |
| 9,266,267 B2 | 2/2016 | De Volder | |
| 2011/0179889 A1* | 7/2011 | De Volder | B29C 33/126 73/866.5 |
| 2012/0038350 A1 | 2/2012 | Bender | |
| 2012/0098550 A1 | 4/2012 | Fanselow | |
| 2014/0165727 A1 | 6/2014 | Mueller | |

FOREIGN PATENT DOCUMENTS

| | | | | |
|---|---|---|---|---|
| DE | 3930702 | | 3/1991 | |
| DE | 4004770 | | 4/1993 | |
| DE | 4300373 | | 7/1993 | |
| DE | 19501268 | | 7/1996 | |
| DE | 4435579 | | 6/1997 | |
| DE | 19753775 | | 6/1999 | |
| DE | 19518157 | | 7/2000 | |
| DE | 19924053 | | 9/2000 | |
| DE | 10056947 | | 5/2002 | |
| DE | 10129222 | | 1/2003 | |
| DE | 10161945 | | 7/2003 | |
| DE | 102004060297 | | 6/2006 | |
| DE | 102006032144 | | 2/2007 | |
| DE | 102006019428 | | 4/2007 | |
| DE | 102005059538 | | 6/2007 | |
| DE | 102006055305 | | 6/2007 | |
| DE | 102006046984 | | 4/2008 | |
| DE | 602005003695 | | 6/2008 | |
| DE | 112006003352 | | 10/2008 | |
| DE | 202008009002 | | 11/2008 | |
| DE | 102007034099 | | 1/2009 | |
| DE | 102007045535 | A1 | 4/2009 | |
| DE | 102008005315 | | 7/2009 | |
| DE | 102008043639 | | 5/2010 | |
| DE | 102009006529 | | 8/2010 | |
| DE | 102005029764 | | 11/2010 | |
| DE | 102010049520 | | 5/2011 | |
| DE | 202008018047 | | 6/2011 | |
| DE | 102011053223 | | 3/2012 | |
| DE | 202011052453 | | 3/2012 | |
| DE | 102010042832 | | 4/2012 | |
| DE | 102011004447 | | 8/2012 | |
| DE | 102012206506 | | 11/2012 | |
| DE | 112010004410 | | 12/2012 | |
| EP | 1603215 | | 12/2005 | |
| EP | 1672328 | | 6/2006 | |
| EP | 2431615 | | 3/2012 | |
| GB | 2037087 | A * | 7/1980 | ........... H01F 27/022 |
| GB | 2083952 | A * | 3/1982 | ......... H01F 17/0006 |
| JP | 01155282 | | 6/1989 | |
| KR | 200363707 | Y1 | 10/2004 | |
| KR | 20110009148 | A | 1/2011 | |
| WO | 9736729 | | 10/1997 | |
| WO | 2010037810 | | 4/2010 | |
| WO | 2011116198 | | 9/2011 | |

OTHER PUBLICATIONS

German Search Report for German Application No. 10 2012 224 075.6 dated Jan. 30, 2014, including partial translation.
International Search Report for International Application No. PCT/EP2013/076927 dated Apr. 24, 2014.
Korean Office Action for Korean Application No. 10-2015-7018819, dated Jul. 22, 2019 with translation, 10 pages. 2019.

* cited by examiner

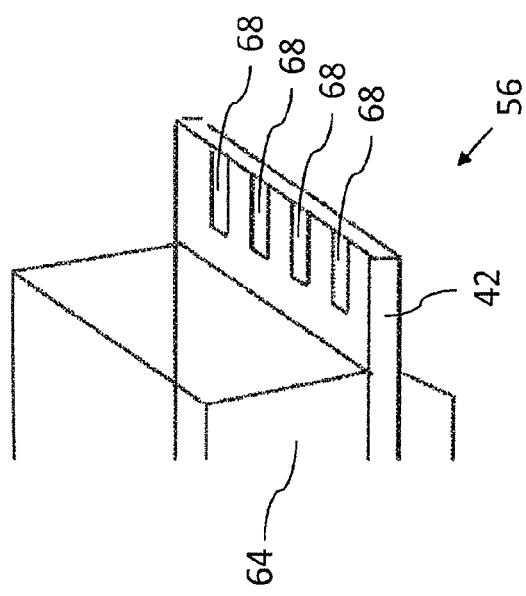
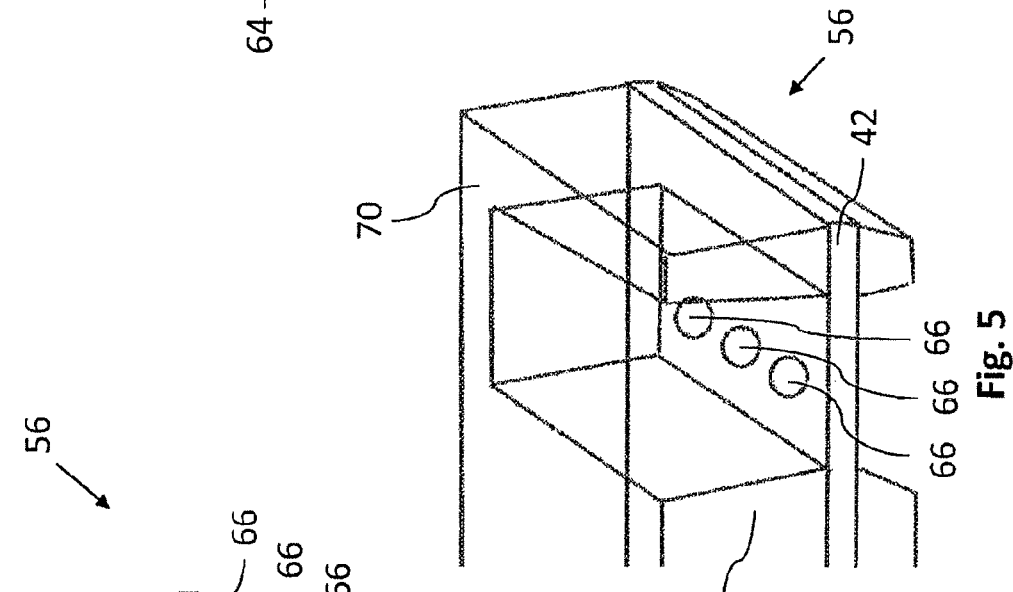
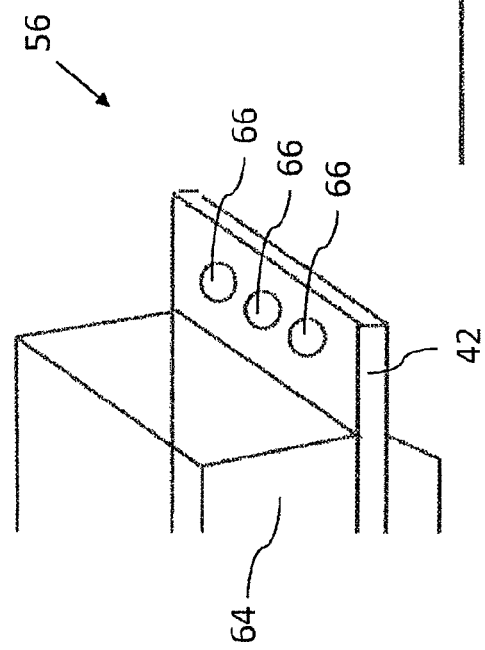

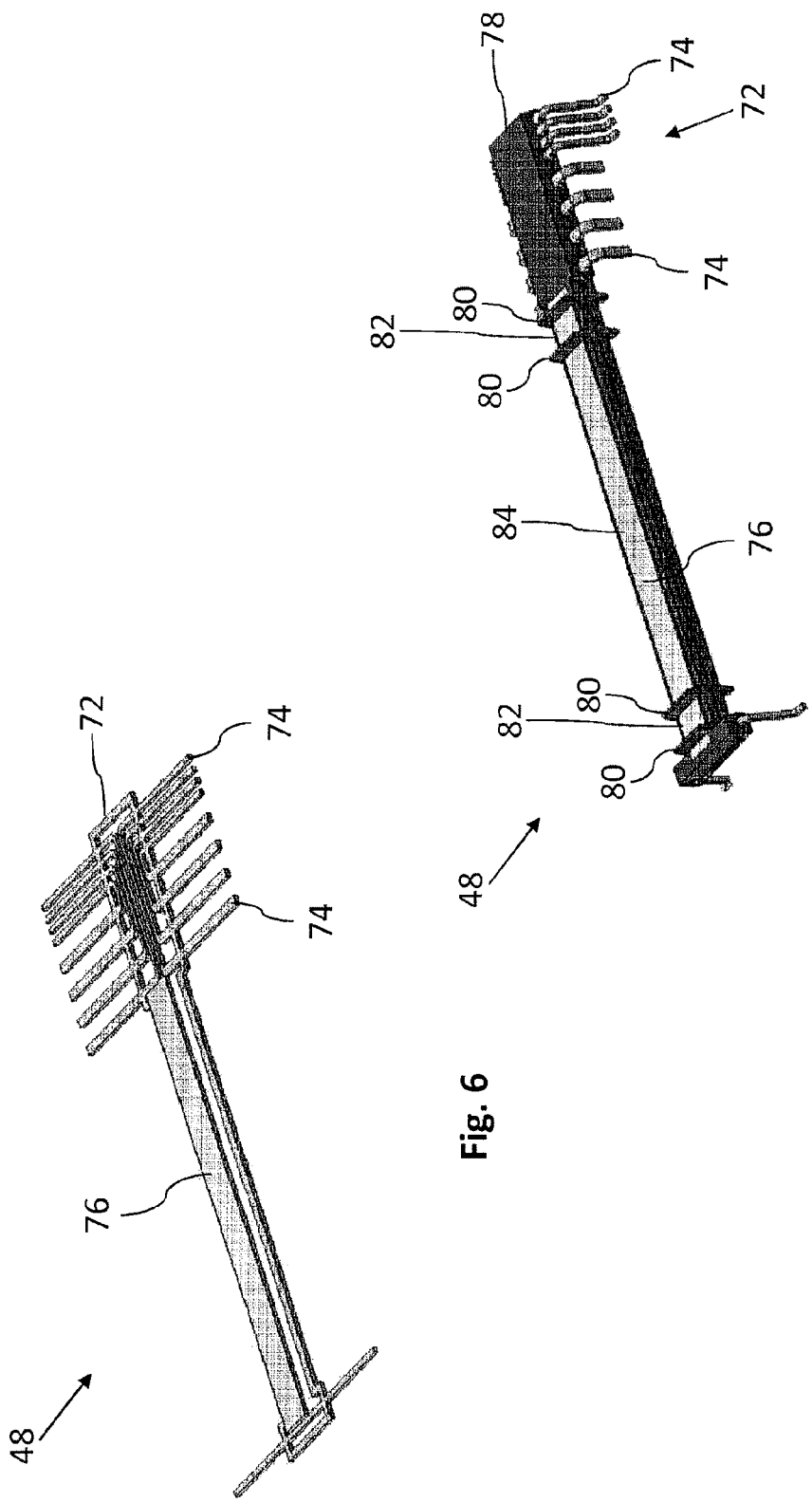

PROTECTIVE COMPOUND-ENVELOPED SENSOR FOR DETECTING THE POSITION OF AN ENCODER ELEMENT

CROSS REFERENCE TO RELATED APPLICATIONS

This application is the U.S. National Phase Application of PCT International Application No. PCT/EP2013/076927, filed Dec. 17, 2013, which claims priority to German Patent Application No. 10 2012 224 075.6, filed Dec. 20, 2012, the contents of such applications being incorporated by reference herein.

FIELD OF THE INVENTION

The invention relates to a sensor for detecting a position of an encoder element, to a method for producing the sensor and to a method for producing a transformer.

BACKGROUND OF THE INVENTION

WO 2010/037 810 A1 discloses a sensor for outputting an electrical signal on the basis of a detected physical variable. The sensor has a measuring circuit which is enclosed in a circuit housing.

SUMMARY OF THE INVENTION

An aspect of the invention consists in improving the known sensor.

In accordance with one aspect of the invention, a sensor for detecting a position of an encoder element, which outputs a physical variable which is dependent on the position, comprises a transducer for converting the physical variable into an electrical encoder signal, a circuit on a wiring carrier for receiving the encoder signal from the transducer and outputting a measurement signal corresponding to the encoder signal, and a protective compound, which at least partially envelops the transducer and the wiring carrier and thus holds the transducer on the wiring carrier.

The specified sensor is based on the consideration that the measuring circuit in the sensor mentioned at the outset could be desired to detect a physical variable which is dependent on the position of an encoder element, such as an electrical and/or magnetic field, light or sound and to convert this signal into an electrical measurement signal which is dependent on the position of the encoder element. Such a position sensor could detect, for example, angular positions and/or linear positions of the encoder element and thus determine the position of a gas pedal and/or brake pedal in a vehicle, for example.

Within the context of the specified sensor, however, it is identified that a transducer for converting the physical variable which is output by the encoder and which is dependent on the position to be detected into an encoder signal, which is dependent at least on the desired measurement signal, needs to be held fixedly on a wiring carrier on which the circuit which outputs the measurement signal is also borne.

In this case, the transducer could be accommodated in a transducer housing. In order to protect the entire sensor from mechanical and other influences, on the one hand, but to hold the individual component parts of the sensor together safely as well, the transducer accommodated in the transducer housing could ultimately be arranged and potted together with the other component parts in a sensor housing.

For this purpose, however, three different elements, namely the converter housing, the potting compound and the sensor housing, would need to be prepared, which would not only be cost-intensive, but would also take up a considerably large amount of installation space.

In contrast, the specified sensor is based on the concept that all of the component parts could be held together via a common protective compound. All of the electrical component parts of the specified sensor such as the transducer and the circuit could be brought into contact with one another, for example, using adhesive-bonding, soldering or sintering technology. In contrast to the abovementioned design, the component parts with which electrical contact has been made could now be encapsulated by injection molding or potting using the protective compound directly in a single injection-molding operation, which in this way not only holds together the component parts of the sensor but also houses them and thus protects them from contamination and other environmental influences such as moisture. In this way, the specified sensor can be constructed at low cost and in a manner which saves on installation space.

The transducer and the wiring carrier can be encapsulated by injection molding or potting using the protective compound directly.

In addition, the transducer and the wiring carrier can be correspondingly encapsulated by injection molding or potting using the protective compound in a single injection-molding operation or a single potting operation.

Finally, the protective compound can form directly an outer housing of the specified sensor.

In one development of the specified sensor, the protective compound has a coefficient of expansion which is within the range of a coefficient of expansion of the electromechanical components. The specified development is based on the consideration that a different coefficient of expansion between the transducer and the protective compound could result in an input of mechanical loads such as mechanical stresses. These mechanical loads could falsify the measurement result, for which reason, within the scope of the specified sensor, the stresses which are input should be kept as low as possible. This is achieved within the scope of the development by a suitable selection of the coefficient of expansion of the protective compound and the transducer.

In a preferred development of the specified sensor, the protective compound comprises a thermosetting plastic material. The thermosetting plastic material has a particularly advantageous effect within the scope of the specified sensor if an electrical component which converts a magnetic flux and has a magnetic core is used as the transducer, the conversion principle of said electrical component being dependent on saturation of the magnetic core. The saturation of the magnetic core is achieved depending on the stresses that are input, which can thus falsify the measurement result. Conventional materials for the magnetic core, such as iron, have a coefficient of expansion which is within the range of the coefficients of expansion of thermosetting plastic materials, however.

In another development of the specified sensor, the circuit on the wiring carrier comprises a part which is free of the protective compound. The sensor could be held fixedly on this free part if the wiring carrier and the transducer are enveloped by the protective compound.

In a preferred development of the specified sensor, the circuit in the part which is free from the protective compound is designed to output the measurement signal. In this way, that part which is exposed and is necessary for applying the protective compound around the wiring carrier and the transducer can be used usefully to connect the specified sensor to a superordinate unit such as, for example, a motor controller in a vehicle via a cable, for example. Electrical contact can be made between the cable and the circuit in the exposed part in this case via contact-making springs, press-in pins, edge grip connectors, soldering or adhesive bonding.

In yet another development of the specified sensor, the transducer is an electrical transformer, in particular a linear inductive position sensor (LIPS), which is designed to transmit at least one reference signal depending on a position of the encoder element as encoder signal. The transformer may be the abovementioned electrical component which converts the magnetic flux. Within the scope of the specified sensor, a transformer should be understood to mean an electrical component which has two coils which are galvanically isolated from one another and which transmit electrical energy between one another via a common contact medium such as air or the abovementioned magnetic core. If the encoder element is a magnet itself, for example, it changes the transmission properties of the common contact medium, which is demonstrated in a changed transmission behavior of the two coils. An LIPS within the scope of the specified sensor is intended to be a transformer which has a third coil, wherein the second and third coils are arranged for the interchange of electrical energy with the first coil. Depending on the position of the encoder element, which is in the form of a magnet, with respect to the second and third coils, a specific configuration of the transformation ratios between the first and second coils and the first and third coils results. Since the position of the encoder element is now detected at two different locations using two different transformation ratios, the abovementioned saturation of the magnetic core can also be used in the detection of the position.

If the coils are wound onto a magnetic core in the transformer via a coil former, the magnetic core in a preferred development has a coefficient of expansion which is in the range of a coefficient of expansion of the coil former. In this way, the coil former can be applied directly to the magnetic core, for example by encapsulation by injection molding with a thermosetting plastic without any inputs of mechanical stresses on the mechanical core and therefore falsifications of the measurement result by the transformer occurring.

Otherwise, these inputs of mechanical stresses would need to be avoided by positioning the magnetic core in an elastic material within the coil former.

In accordance with a further aspect of the invention, a method for producing a specified sensor comprises the following steps:
making contact between the transducer and the circuit on the wiring carrier, and
enveloping the transducer and the wiring carrier at least partially with the protective compound so that the protective compound holds the transducer on the wiring carrier.

In a particular development of the specified method, a surface of the wiring carrier and/or of the transducer which is to be enveloped by the protective compound is activated prior to the transducer and the wiring carrier being enveloped by the protective compound. Activation of the surface of the wiring carrier and/or of the converter will be understood below to mean partial destruction of the molecular structure of the surface of the wiring carrier and/or the converter so that free radicals are produced on the surface of the wiring carrier and/or the converter. These free radicals are capable of entering into chemical and/or physical bonds with the protective compound so that said protective compound can no longer be detached from the surface of the wiring carrier and/or the converter.

The protective compound can in this case comprise a polar material, such as polyamide. The polar polyamide can be connected physically to the activated surface of the wiring carrier and/or the converter in a manner known to a person skilled in the art and can thus improve the mechanical hold between the wiring carrier and the converter.

In an additional development of the specified sensor, at least part of the surface of the wiring carrier and/or the converter is roughened in the contact region with the protective compound so that the effective activated surface is enlarged and the adhering effect between the wiring carrier and/or the converter and the protective compound is increased.

In a particular development of the specified sensor, the roughened part of the surface of the wiring carrier and/or the converter is roughened using a laser. The surface of the wiring carrier and/or the converter can not only be activated by the laser, but also form-releasing means which may be provided are also removed by the laser from the surface of the wiring carrier and/or the converter, which form-releasing means could suppress adhesion between the wiring carrier and/or the converter and the protective compound.

In accordance with a further aspect of the invention, a method for producing an electrical transformer, in particular a linear inductive position sensor (LIPS) comprises the following steps:
arranging electrical connections for the transformer and a magnetic core for the transformer,
forming a coil former around the magnetic core in such a way that the electrical connections are held by the coil former, and
winding at least one coil wire onto the coil former.

The specified method can be extended by features which correspond to the features of the abovementioned transformer accordingly. In particular, a coefficient of expansion of the magnetic core can be in the range of a coefficient of expansion of the coil former with the advantages already mentioned.

BRIEF DESCRIPTION OF THE DRAWINGS

The above-described properties, features and advantages of this invention and the way in which they are achieved will become clearer and more easily comprehensible in connection with the description below of exemplary embodiments, which are explained in more detail in connection with the drawings, in which:

FIG. 3 shows an interface at the position sensor shown in FIG. 2,

FIG. 4 shows an alternative interface at the position sensor shown in FIG. 2,

FIG. 5 shows another alternative interface at the position sensor shown in FIG. 2, FIG. 6 shows a converter in the position sensor shown in FIG. 2 in a first production state, and FIG. 7 shows a converter in the position sensor shown in FIG. 2 in a second production state.

DETAILED DESCRIPTION OF THE PREFERRED EMBODIMENTS

The same technical elements are provided with the same reference symbols and only described once in the figures.

Figure 1:
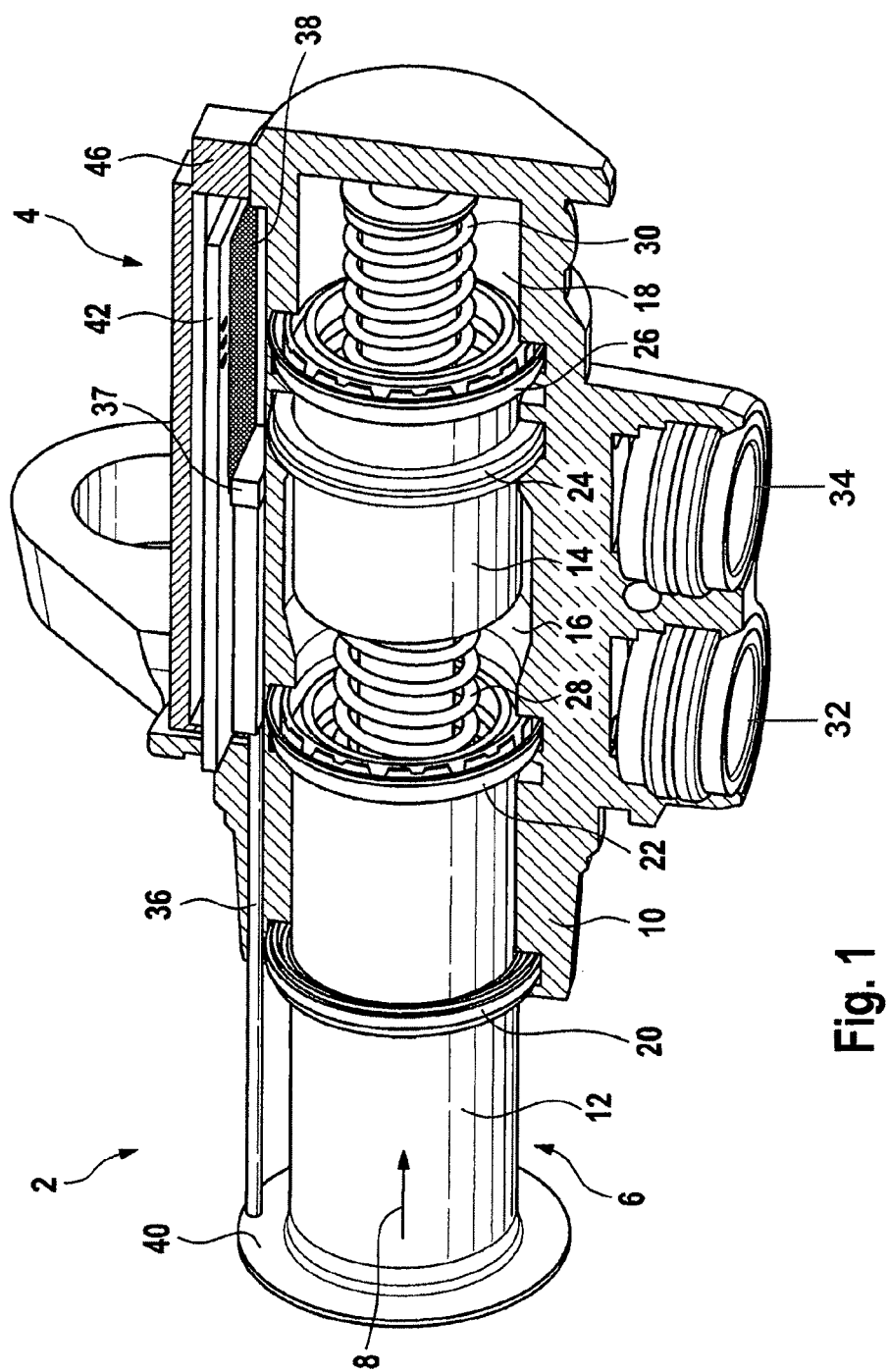
FIG. 1 shows a tandem master cylinder comprising a position sensor.

Reference is made to FIG. 1, which shows a tandem master cylinder 2 comprising a position sensor 4.

The tandem master cylinder 2 also has a pressure piston 6, which is arranged movably in a movement direction 8 in a housing 10, wherein the movement of the pressure piston 6 can be controlled by a foot pedal (not shown). The pressure piston 6 itself is divided into a primary piston 12 and a secondary piston 14, wherein the primary piston 12 closes an inlet of the housing 10 and the secondary piston 12 divides the interior of the housing 10 into a primary chamber 16 and a secondary chamber 18. A secondary collar 20 is arranged in the region of the inlet of the housing 10 on the primary piston 12, which secondary collar insulates the interior of the housing 10 from the ambient air. When viewed into the interior of the housing 10, a primary collar 22 follows the secondary collar 20, said primary collar sealing a gap between the primary piston 12 and a wall of the housing 10. A pressure collar 24 on the secondary piston 14 isolates the pressure of the primary chamber 16 from the pressure of the secondary chamber 18. In addition, a further primary collar 26 on the secondary piston 14 seals a gap between the secondary piston 14 and the wall of the housing 10. The primary piston 12 is supported against the secondary piston 14 via a first spring 28, while the secondary piston is supported against a housing base via a second spring 30. Correspondingly, hydraulic fluid (not shown) can be supplied to the primary chamber 16 and the secondary chamber 18 via a first and second connection 32, 34.

Since the mode of operation of a tandem master cylinder is known to a person skilled in the art, no detailed description thereof is provided here.

The position sensor 4 has a sampling element in the form of a slide 36 comprising a sensor magnet 37 at its top end, which, when viewed into the plane of the drawing, can be pushed beneath a sensor circuit 38 (yet to be described). In order to push the slide 36, the primary piston 12 has a flange 40, which the slide 36 abuts. The flange 40 and the primary piston 12 therefore together form a measurement object, whose position is determined by the sensor circuit 38 (yet to be described) of the position sensor 4. The sensor circuit 38 is formed from a plurality of conductor tracks on a wiring carrier 42, such as a leadframe, a printed circuit board or another substrate. In order to protect against contamination, for example, a cover 46 can be positioned on the printed circuit board 42 with the sensor circuit 38.

Figure 2:
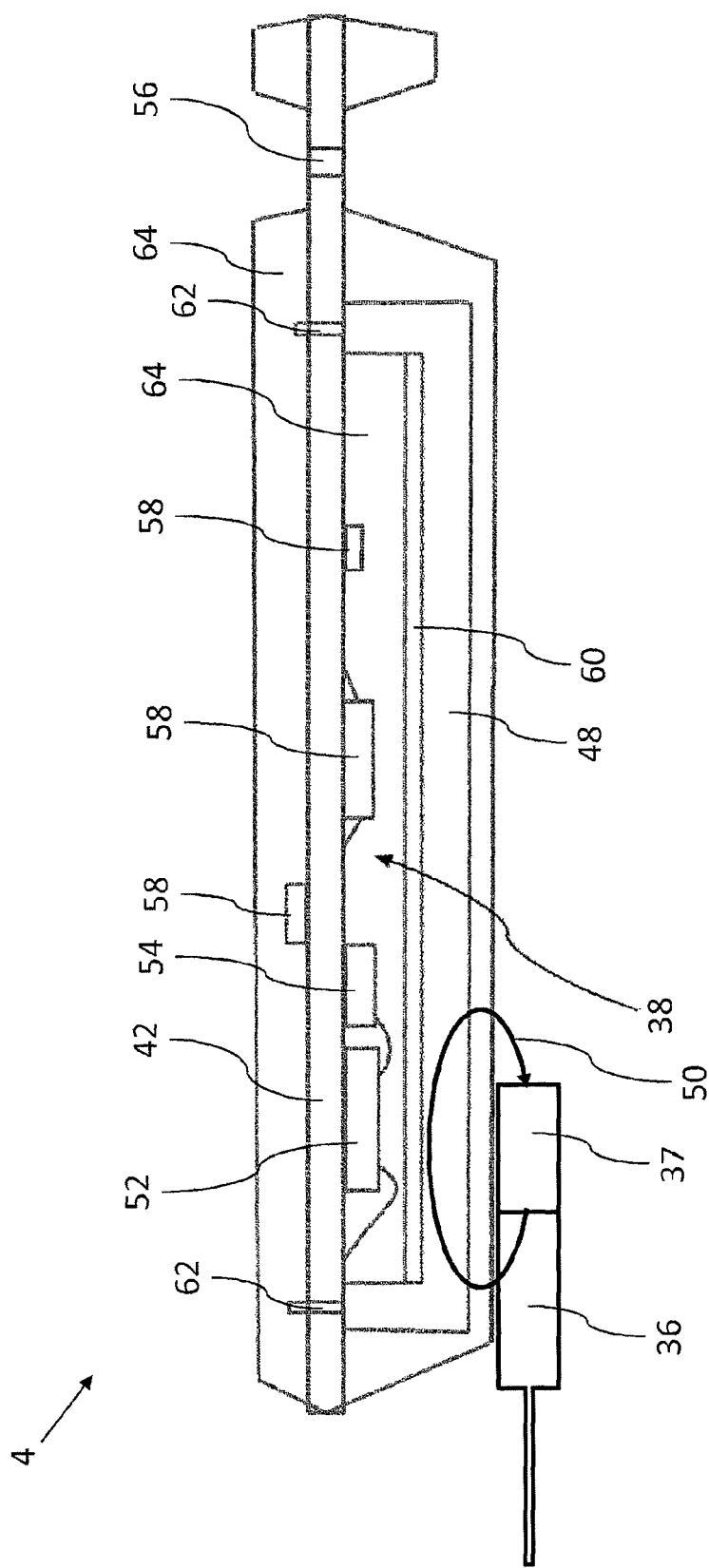
FIG. 2 shows the position sensor from FIG. 1.

Reference is made to FIG. 2, which shows the position sensor 4 shown in FIG. 1.

The circuit 38 of the position sensor comprises a transducer 48, which in the present embodiment is in the form of a linear inductive position sensor (LIPS). The transducer 48 detects a magnetic field 50 of the sensor magnet 37 and thereupon outputs an electrical sensor signal (not denoted) to the circuit 38 on the basis of this magnetic field. This sensor signal is converted by a first signal processing chip 52 and a second signal processing chip 54 into a measurement signal (not denoted), from which the position of the slide 36 and therefore the position of the flange 40 and the primary piston 12 is provided. The measurement signal thus produced can finally be tapped off at a transmission interface 56 of the position sensor 4 via a cable (not illustrated) and passed on to a higher signal processing unit (not illustrated) such as, for example, a motor controller in a vehicle (not illustrated).

The circuit 38 can comprise protection elements 58 for protecting the two signal processing chips 52, 54, for example from an overvoltage. In addition, a shielding plate 60 can be arranged between the circuit 38 and the transducer 48, said shielding plate shielding electromagnetic fields between the circuit 38 and the transducer 48 and thus avoiding an influence of the circuit 38 on the transducer 48.

In the present embodiment, the transducer 48 is arranged via a form-fitting connection 62 in a defined position on the wiring carrier 42. In this case, a protective compound 64, which holds the wiring carrier 42 and the transducer 48 mechanically together, the wiring carrier 42 and the transducer 48. In this way, the protective compound 64 can not only ensure a mechanical stability between the wiring carrier 42 and the transducer 48, but an interior of the position sensor 4 with the circuit 38 is also effectively protected from contamination. In this case, this interior can particularly preferably likewise be filled with the protective compound 64.

The position sensor 4 can be encapsulated by injection molding, for example, with the protective compound 64 during production. For this purpose, the wiring carrier 42 of the position sensor 4 can be held on the transmission interface 56, for example, which in any case needs to remain free in order to make electrical contact with the abovementioned cable.

This transmission interface 56 can be embodied differently, which is shown in FIGS. 3 to 5. According to said figures, the transmission interface can comprise contact bores 66 or edge group plugs 68. The transmission interface 56 can in this case also be surrounded by a wall 70 formed from the protective compound 64, as shown in FIGS. 2 and 5.

Reference is made to FIG. 6, which shows the transducer 48 in the position sensor 4 from FIG. 2 in a first production state.

In order to produce the transducer 48, which is to be in the form of an LIPS, a leadframe 72 with contact legs 74 is punched out for the first production state, said leadframe mechanically supporting the transducer 48 on the abovementioned wiring carrier 42 and making electrical contact between said transducer and the circuit 38 on the wiring carrier 42. For reasons of clarity, only some of the contact legs 74 have been provided with a reference symbol in FIG. 6.

Then, a magnetic core 76 is arranged in the leadframe 72, said magnetic core later being provided for transmission of a magnetic field between coils (yet to be described).

Reference is made to FIG. 7, which shows the transducer 48 in the position sensor 4 from FIG. 2 in a second production state.

In order to produce the second production state shown in FIG. 7, the leadframe 72 is enveloped with the magnetic core 76 by a transducer protective compound 78. This transducer protective compound 78 in the present embodiment consists of a thermosetting plastic, which has a substantially identical coefficient of thermal expansion to the magnetic core 76, which can be produced from iron, for example. In the event of temperature fluctuations, hardly any mechanical stresses can be input into the magnetic core 76.

The transducer protective compound 78 is in this case formed with four separating elements 80 such that they divide the magnetic core 76 into two outer winding regions 82 and an inner winding region 84. In this case, the outer winding regions 82 are shorter than the inner winding region 84.

Then, if the transducer protective compound 78 has been cured, for example, the contact legs 74 can then be bent in the direction of a lower side of the transducer 48, as shown in FIG. 7.

In order to finish the transducer 48, coil wires (not illustrated) are wound onto the transducer into the winding regions 82, 84. A primary coil is in this case wound beyond all of the winding regions 82, 84, whereas a physically identical secondary coil is wound on into in each case one of the outer winding regions 82.

During operation of the transducer, an electrical AC voltage signal is applied to the primary coil, for example, which AC voltage signal should induce an identical output signal in the physically identical secondary coils via the magnetic core 76.

If the sensor magnet 37 of the slide 36 now approaches one of the two secondary coils, it drives the magnetic core 76 into saturation. This results in a changed transmission behavior of the electrical AC voltage signal between the primary coil and the corresponding secondary coil, to which the sensor magnet 37 has got closer, which can be evaluated via the sensor circuit in a manner known to a person skilled in the art. In this way, the position of the sensor magnet 37 can be detected via the transducer 48.

The invention claimed is:

1. A sensor for detecting a position of an encoder element, said sensor comprising a transducer having coil wires, a magnetic core having a length extending along an axis of the magnetic core, a circuit on a wiring carrier, and a protective compound comprising a thermosetting plastic material which at least partially envelops the transducer and the wiring carrier and thus holds the transducer on the wiring carrier, wherein the protective compound defines exactly four separating elements, each of the exactly four separating elements in direct contact with and extending outward from the magnetic core in an orthogonal direction relative to the axis of the magnetic core, the exactly four separating elements dividing the magnetic core along the length of the magnetic core into two outer winding regions and one inner winding region, the two outer winding regions each being shorter along the length of the magnetic core than the one inner winding region, and wherein the coil wires are wound around the axis of the magnetic core onto the magnetic core between respective ones of the exactly four separating elements that divide the magnetic core into each of the outer winding regions and between respective ones of the exactly four separating elements that divide the magnetic core into the inner winding region.

2. The sensor as claimed in claim 1, wherein the circuit on the wiring carrier comprises a part which is free of the protective compound.

3. The sensor as claimed in claim 1, wherein the transducer is an electrical transformer.

4. The sensor as claimed in claim 1, wherein the transducer is a linear inductive position sensor (LIPS).

5. The sensor as claimed in claim 1, wherein the protective compound forms an outer housing of the sensor.

* * * * *